(12) United States Patent
Kemmler et al.

(10) Patent No.: US 8,607,187 B2
(45) Date of Patent: Dec. 10, 2013

(54) SYSTEM AND METHOD FOR MINI-EHP DEVELOPMENT AND DELIVERY

(75) Inventors: Andreas Kemmler, Bönnigheim (DE); Torsten Kamenz, Wiesloch (DE)

(73) Assignee: SAP AG, Walldorf (DE)

( * ) Notice: Subject to any disclaimer, the term of this patent is extended or adjusted under 35 U.S.C. 154(b) by 482 days.

(21) Appl. No.: 12/977,442

(22) Filed: Dec. 23, 2010

(65) Prior Publication Data

US 2012/0167034 A1 Jun. 28, 2012

(51) Int. Cl.
*G06F 9/44* (2006.01)
(52) U.S. Cl.
USPC ............................ 717/101; 717/100; 717/102
(58) Field of Classification Search
None
See application file for complete search history.

(56) References Cited

U.S. PATENT DOCUMENTS

| | | | | |
|---|---|---|---|---|
| 6,405,364 B1* | 6/2002 | Bowman-Amuah | .......... | 717/102 |
| 7,559,049 B1* | 7/2009 | Hemmat et al. | ............. | 717/102 |
| 7,937,685 B2* | 5/2011 | Weil et al. | ..................... | 717/100 |
| 8,006,222 B2* | 8/2011 | Ruhe | ............. | 717/101 |
| 8,418,147 B1* | 4/2013 | Odenwelder et al. | ......... | 717/128 |
| 2002/0078046 A1* | 6/2002 | Uluakar et al. | ................... | 707/8 |
| 2003/0009740 A1* | 1/2003 | Lan | ............... | 717/102 |
| 2004/0243968 A1* | 12/2004 | Hecksel | ........ | 717/100 |
| 2005/0216879 A1* | 9/2005 | Ruhe | ............. | 717/101 |
| 2007/0027934 A1* | 2/2007 | Roehrle et al. | ................ | 707/203 |
| 2007/0156731 A1* | 7/2007 | Ben-Zeev | ..................... | 707/101 |
| 2009/0210852 A1* | 8/2009 | Martineau | ...................... | 717/101 |
| 2009/0271760 A1* | 10/2009 | Ellinger | ......................... | 717/101 |
| 2011/0145913 A1* | 6/2011 | Battle et al. | ...................... | 726/19 |
| 2012/0159431 A1* | 6/2012 | Kemmler et al. | ............. | 717/108 |

OTHER PUBLICATIONS

Jeremy Miller, "Incremental Delivery Through Continuous Design", 2009 MSDN Magazine, pp. 1-5; <http://msdn.microsoft.com/en-us/magazine/ee294453.aspx>.*
Boehm et al., "Using the Incremental Commitment Model Process Decision Table for Integrated Systems and Software Engineering", Apr. 2008, Systems and Software Technology Conference, pp. 1-93; <http://sstc-online.org/2008/pdfs/JL1949.pdf>.*
Benestad et al., "A Comparison of Model-based and Judgment-based Release Planning in Incremental Software Projects", 2011 ACM, ICSE'11, May 21-28, 2011, Waikiki, Honolulu, HI, USA, pp. 766-775; <http://dl.acm.org/citation.cfm?doid=1985793.1985901>.*
Ware et al., "The Use of Intra-Release Product Measures in Predicting Release Readiness", 2008 IEEE, pp. 230-237; <http://ieeexplore.ieee.org/stamp/stamp.jsp?tp=&arnumber=4539550>.*

* cited by examiner

*Primary Examiner* — Thuy Dao
*Assistant Examiner* — Ben C Wang
(74) *Attorney, Agent, or Firm* — Kenyon & Kenyon LLP

(57) ABSTRACT

A more tailored and flexible update schedule is provided for large enterprise software development and delivery through mini-releases. Instead of delivering update packages after a development and delivery period, e.g., 18 months, where the update packages include an update release for the entire software package, the software package may be broken down into component parts. Mini-releases may then be issued several times during the same delivery period (e.g., 18 months). Each mini-release may include a small subset of the component parts to be focused on, allowing greater flexibility, without greatly increasing code release efforts (e.g., as required by releasing the whole software suite in an update).

18 Claims, 4 Drawing Sheets

Fig. 1A

| EHP 6 | EHP 7 | Mini EHP 8 |
|---|---|---|
| 2011 | 2012 | 2013 |
| Component 1.A | Component 1.B | |
| Component 2.A | Component 2.B | |
| Component 3.A | Component 3.B | ⋮ |
| Component 4.A | Component 4.B | |
| Component 5.A | Component 5.B | |
| Component 6.A | Component 6.B | |
| Component 7.A | Component 7.B | |

Fig. 1B

| 2011 | | | 2012 | | | 2013 | |
|---|---|---|---|---|---|---|---|
| Mini EHP 6 | Mini EHP 7 | Mini EHP 8 | Mini EHP 9 | Mini EHP 10 | Mini EHP 11 | | |
| Component 1.A | | Comp. 1.B | | | Comp. 1.C | | |
| Component 2.A | | Comp. 2.B | | | | | |
| Comp. 3.A | | Comp. 3.B | | | | | |
| Comp. 4.A | | Comp. 4.B | | | | | |
| Comp. 5.A | | Comp. 5.B | | | Comp. 5.C | | |
| Comp. 6.A | Comp. 6.B | | | | Comp. 6.C | | |
| Comp. 7.A | | | Comp. 7.B | | | | |

SYSTEM AND METHOD FOR MINI-EHP DEVELOPMENT AND DELIVERY

BACKGROUND

Business entities require business software for performing an array of essential tasks, such as communication, planning, inventory control, order processing, systems monitoring, and nearly every facet of a business' operations. A business entity often requires a software solution with features, interfaces, data management, and other aspects unique to that one specific company. Yet, core functions may be similar among the different unique solutions. These core functions may be provided to several, unique business entities, e.g., companies. In addition to needing to vary several initial deployments among a variety of customer-companies, these varied implementations may need constant updating, to evolve with the evolving business' needs.

Software developers may design and provide a set of software tools in a generic or universal form. These tools may provide a functional foundation for a software suite (e.g., a plurality of related applications). The software suite may provide various interfaces to released objects (e.g., public objects) so that end-user clients may customize various aspects of their specific install of the software suite. With customer configuration data, customers may be able to modify every aspect of their software experience, including defining the user interfaces, what functions are available on the interfaces, and/or what fields are provided to the user.

To help maintain these software packages, SAP AG (a developer) introduced an enhancement package strategy as a means to simplify the way customers manage and deploy new software functionality. Customers may selectively implement these software innovations from a developer and activate the software upon business demand. As a result, customers can isolate the impact of software updates from introducing/rolling out new functionality and bring new functionality online faster through shortened testing cycles. Customers no longer have to plan for major releases every few years. They may now choose to selectively implement the business functions or technical improvements that add the value that matters most to their business. A developer may use enhancement packages to quickly and easily deliver business and industry-specific functionality, enterprise services, and other functions that help improve and simplify the use of software through user interface and other end-to-end process improvements.

These enhancement packages may have some inflexible characteristics. For example, the enhancement packages may be cumulative from a functional perspective, e.g., current enhancement packages may contain the entire content of earlier packages. So each enhancement package may be based on the previous one. Enhancement packages may also have the same maintenance duration as the underlying core application. Each enhancement package may contain new versions of existing software components. With the enhancement packages customers can choose which software components are updated in their systems, depending on the new/extended functionality they want to use, but the entirety of the software package may be delivered as a whole, regardless of which parts are new and which parts are activated after delivery.

A software suite utilizing the enhancement package update strategy (e.g., ERP "Enterprise Resource Planning") may comprise several relatively decoupled software components. The software components may comprise the units that can be installed separately by customers (e.g., through the switch framework and enhancement package deliveries). This may mean that customers interested in innovations from Human Resources might only install the software components related to that area, e.g., EA-HR and/or SAP_HR, whereas customers interested in innovation from the retail business might just install the software components related to retail, such as EA-RETAIL and SAP_APPL, in addition to any underlying foundational components.

The EHPs (e.g., enhancement packages) may be delivered approximately every 12-18 months and an EHP may contain a new version (containing innovations) of each software component. Each software component may mean a new version of the source code which may need to be maintained until a contractually agreed maintenance period ends. This may mean each new source code version creates additional maintenance effort for the developer. This also means that it is in the interest of the developer to have as few as possible different source code versions. On the other hand, there is also a competing interest in offering new innovations as fast as possible to market, so that the customers can use the new functionality as soon as possible. Further, each investment area (e.g., human resource, financial, or retail) may act like independent development projects with their own customer segments, own innovation ideas, and the groups may desire to supply their respective market segment in timeframes they believe are best for their respective solutions.

Current EHP solutions may not facilitate this individuality, as an EHP may have a common timeline, where each investment area has to release within the same 12-18 month interval. Thus, it may be that areas being ready for delivery have to wait for the common EHP shipment date and areas not ready for delivery at the EHP shipment date have ship what they have and do the rest in the next EHP. For internal projects this creates an inefficient compromise, leading to delayed market entry for faster components and leading to additional source code version for the ones which have huge and long running investments (e.g., those that needed more time and thus has a partial release followed by finishing releases in the next cycle).

Example embodiments of the present invention may provide a more tailored delivery of EHP components.

BRIEF DESCRIPTION OF THE DRAWINGS

FIG. 1A illustrates an example embodiment of update releases according to an example EHP schedule.

FIG. 1B illustrates an example embodiment of an optimized mini-release schedule, according to one example embodiment of the present invention.

DETAILED DESCRIPTION

Figure 2:
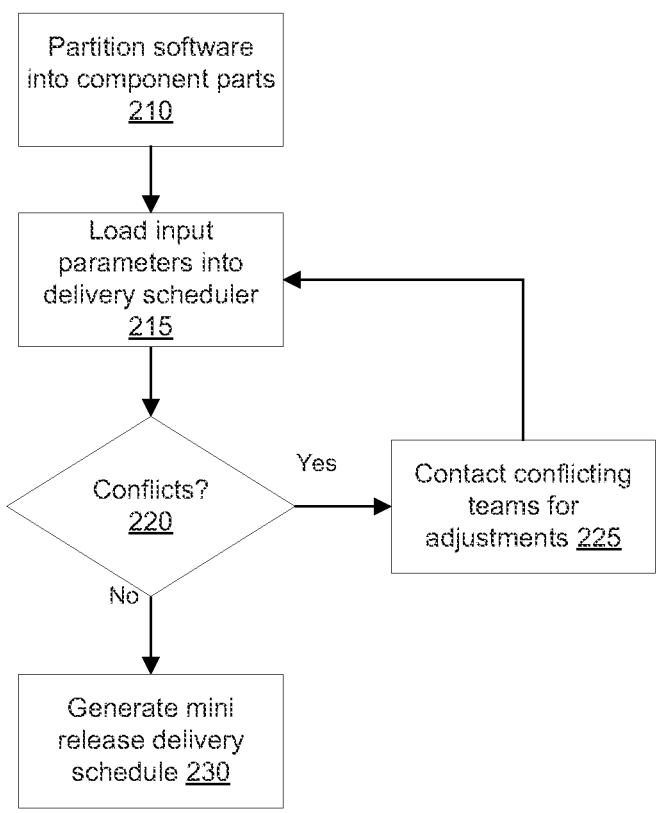
FIG. 2 illustrates one example method, according to one example embodiment of the present invention.

Example embodiments of the present invention may give the different investment areas the flexibility they need while remaining manageable regarding complexity, dependencies, and internal costs. This may be achieved in the example embodiments with a new concept of Mini EHPs and with a supporting tool, the Mini EHP scheduler.

In contrast to existing EHPs, a Mini EHP may contain only a subset of the overall foundational software package components. The investments may then be focused on certain areas, and only those areas will ship their innovations within a certain Mini EHP. Then, in a subsequent Mini EHP, the investments may be focused on different areas, and those areas may get a chance to deliver their innovations within that Mini EHP. This may provide a more focused investment. For users (e.g., customers), this has the advantage that they may only need to bother with a Mini EHP when that mini EHP's investment area is of interest to that user.

The delivery frequency of mini EHPs may be greater than the full version EHPs. Mini EHPs may be offered on a shorter cycle, e.g., a half-year basis. This means there may be approximately two Mini EHPs per year, each of them with a clear focus on one or at most a few areas. This increased delivery option may offer the different investment areas the agility they really need. New market trends could be adopted quicker and a first delivery is possible at two delivery options each year. The investment area may therefore be able to immediately establish a presence in the area, while delivering a round off in a second shipment.

An additional benefit may include consolidation alternatives. Currently, all development from all component areas are consolidated into exactly one package. This means everyone (e.g., every development team) is working for the same EHP. This may not provide a possibility to do long-term developments, even when it is clear from the beginning that the timeline of the current EHP is too short. With Mini EHPs it may be possible to target different EHPs from the beginning. This means the developments of the different areas are consolidated into different EHPs from the start.

FIG. 1A illustrates EHP releases under the known enhancement package strategy described above. EHP 6 may begin development at the start of 2011, or may have begun before then, and is releases at the end of 2011. EHP 7 may then begin development and be released 18 months later, e.g., mid-2013. Each EHP (e.g., the foundational software suite) may contain a plurality of component pieces, e.g., Component 1 to 7. These may include the human resources package, retail package, finance package, etc. Each component piece may be delivered in lock-step with the 12-18 month EHP release cycle, as illustrated.

FIG. 1B illustrates one example delivery timeline with the mini EHP model. As illustrated, mini-EHPs may be delivered in shorter timeframes (e.g., half-year cycles). This may afford a faster, more tailored release schedule for development teams. For example, as illustrated components 3.A and 4.A may be released in mid-2011, whereas in FIG. 1A, both may be required to wait until the end of 2011 and the release of the total package. Further, the development teach in charge of component 7 may require all of 2011 and the first half of 2012 for the release of 7.A, which is possible under the mini-EHP system of FIG. 1B. However, under the regular EHP schedule, they would have to package up what they could for the end of 2011 EHP release and then wait another eighteen months for the follow-on release of EHP 7. While component 7.B may have required that amount of time, the remaining functionality of component 7.A may needlessly sit ready for an extra year, when a faster release was possible under the mini-EHP system.

In order to facilitate the mini-EHP system, a mini-EHP scheduler may be needed as a planning optimizer to find the right and optimally fitting delivery date for each of the ERP software components. The scheduler may receive a number of data inputs for this. The scheduler should account for all ERP investment areas for some period of time into the future, e.g., approximately the next two years. This may mean all areas of ERP (e.g., HR, Controlling, Financial, Logistics, etc.) where new investments and/or deliveries are planned in that time frame. The scheduler may account for which software components the ERP investment areas are working in. Many investment areas may require work to be performed in more than one ERP software component. In these cases, e.g., that more than one software component is involved, the dependencies between them may need to be accounted for as scheduler input. It should be known which of the work packages of the investment area depends on each other and which of them affects which software component. The scheduler may account for the dependencies of all investment areas delivered from other components. Input may include the planned delivery dates of all ERP investment areas. Input may include an importance rating of each ERP investment areas and any pending customer commitments or contract requirements.

Once this information is provided to the mini-EHP scheduler, it may calculate a first draft of the delivery schedule for all ERP software components. It may also visualize the entered investment areas with their attributes. It may further visualize conflicts and determine optimization potential. For example, one software component may have to be delivered late because a particular investment area altering the component plans on a late delivery date, but several others could deliver at an earlier date. This may be a conflict as well as a chance for optimization. An appropriate alternative for the particular investment area may be found, such that the whole software component could be delivered earlier. Knowing about such conflicts early may therefore provide valuable information, since it is here that the manual conflict solving process can start. The project with the late delivery date may be contacted, and it may be evaluated whether there are alternative deliveries possible. The results/compromises of these discussions may be entered correspondingly into the scheduler, and a next version of the delivery draft may be created.

During the development period, the mini-EHP sheduler may be kept up to date with the relevant inputs. This may mean additional projects/investment areas could be entered, as well as changes to dependencies of already started developments. Newly entered projects could lead to changes in the delivery schedule, but such a change may to be done carefully and only when really needed since the other investment areas may be relying on the previously drafted schedule. The mini-EHP scheduler may therefore offer some kind of change request functionality. It may determine the people responsible for the affected investment areas and may propose a change. Their feedback may be collected and be considered correspondingly, and entered into the mini-EHP scheduler, which may lead to a new version of the delivery draft.

The Mini EHP Scheduler may also offer the possibility to change the calculated delivery date of a software component and which projects are affected by such a change. Such a direct change might be needed to reduce the delivery complexity and align the delivery date to some external factors. The mini-EHP scheduler may therefore offer the possibility to evaluate the trade-off of a high delivery flexibility and a more manageable delivery complexity.

FIG. 2 illustrates an example method, according to one example embodiment of the present invention. First, the example method may partition an underlying software package into component parts, at 210. Next, at 215, the example method may load input parameters into a delivery scheduler, such as importance, resource requirements, customer obligations, planned deadlines, etc. The delivery scheduler may next check for conflicts. If conflicts are identified, at 225, the teams associated with each conflict may be notified, and adjustments may be inputted. If there are no conflicts, the scheduler may generate a mini release delivery schedule at 230. The method may continue as input adjustments change (not shown), such as deadlines changing, customer obligations being formed or dissolving, etc.

Figure 3:
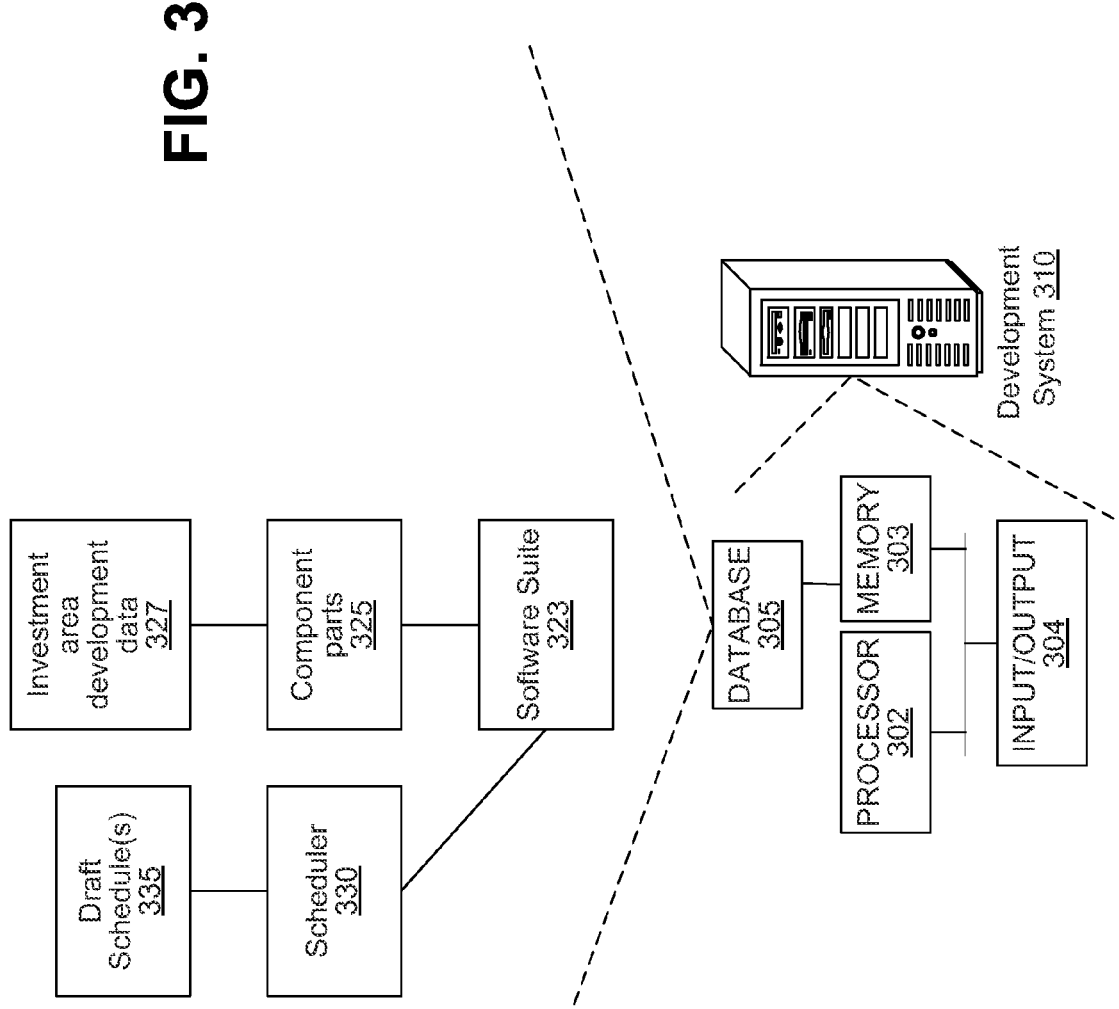
FIG. 3 illustrates one example system, according to one example embodiment of the present invention.

FIG. 3 illustrates one example system, according to an embodiment of the present invention. The example may include one or more server computer systems, e.g., development system 310. This may be one server, a set of local servers, or a set of geographically diverse servers. Each server may include an electronic computer processor 302, one or more sets of memory 303, including database repositories 305, and various input and output devices 304. These too may be local or distributed to several computers and/or locations. Database 305 may include data comprising the various software components of the other example embodiments of the present invention.

For example, the database may include the software suite under development 323. The database may include the scheduler 330, and any draft schedules created 335. The software suite 323 may include a plurality of component parts 325, which may be broken down into, or form the foundation of various investment areas. Data associated with these investment areas may also be stored in the database, e.g., at 327. These entities may be stored in database 305, or may be distributed across other systems, independently or connected via a communication network.

Any suitable technology may be used to implement embodiments of the present invention, such as general purpose computers. One or more system servers may operate hardware and/or software modules to facilitate the inventive processes and procedures of the present application, and constitute one or more example embodiments of the present invention. Further, one or more servers may include a computer readable storage medium, e.g., memory 303, with instructions to cause a processor, e.g., processor 302, to execute a set of steps according to one or more example embodiments of the present invention.

Further, example embodiments of the present invention are directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods and procedures.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A method for accelerating large enterprise application development, comprising:
   identifying a plurality of component parts of an underlying software package, wherein each component part provides functionality to at least one investment area from a plurality of enterprise resource planning investment areas;
   dividing the plurality of component parts into release groups;
   proposing mini-releases, each mini-release including a subset of component parts;
   providing input parameters to a mini-release scheduler, wherein the input parameters include 1) a mapping between the each investment area and its required component parts and 2) a planned delivery date of the each mini-release to its respective at least one investment area;
   identifying, with an electronic processor, conflicts between the input parameters by:
      calculating dependencies between the plurality of investment areas based on the required component parts of the each investment area, and
      determining changes to the planned delivery date of the each mini-release based on the calculated dependencies;
   notifying, with the electronic processor, each development team associated with any one of the conflicts; and
   scheduling, with the electronic processor, mini-releases such that the whole underlying software package is released via several consecutive mini-releases, wherein major-releases include the whole underlying software package delivered to customers, and the several consecutive mini-releases are delivered between the major-releases.

2. The method of claim 1, wherein each component part delivered in a mini-release includes a switch such that the each component part is only activated after a customer activates the switch.

3. The method of claim 1, wherein every release creates a new source code version that must be maintained by the developer for an extended period of time.

4. The method of claim 3, wherein the extended period of time is defined by a customer contract.

5. The method of claim 1, wherein each component part depends on a plurality of foundational functions, and wherein several component parts depend on a single shared foundational function.

6. The method of claim 5, wherein one of the conflicts includes two component parts of the several component parts having different mini-release dates.

7. A non-transitory computer-readable storage medium encoded with instructions configured to be executed by a processor, the instructions which, when executed by the processor, cause the performance of a method, comprising:
   identifying a plurality of component parts of an underlying software package, wherein each component part provides functionality to at least one investment area from a plurality of enterprise resource planning investment areas;
   dividing the plurality of component parts into release groups;

proposing mini-releases, each mini-release including a subset of component parts;
providing input parameters to a mini-release scheduler, wherein the input parameters include 1) a mapping between the each investment area and its required component parts and 2) a planned delivery date of the each mini-release to its respective at least one investment area;
identifying, with an electronic processor, conflicts between the input parameters by:
  calculating dependencies between the plurality of investment areas based on the required component parts of the each investment area, and
  determining changes to the planned delivery date of the each mini-release based on the calculated dependencies;
notifying, with the electronic processor, each development team associated with any one of the conflicts; and
scheduling, with the electronic processor, mini-releases such that the whole underlying software package is released via several consecutive mini-releases, wherein major-releases include the whole underlying software package delivered to customers, and the several consecutive mini-releases are delivered between the major-releases.

8. The computer-readable storage medium of claim 7, wherein each component part delivered in a mini-release includes a switch such that the each component part is only activated after a customer activates the switch.

9. The computer-readable storage medium of claim 7, wherein every release creates a new source code version that must be maintained by the developer for an extended period of time.

10. The computer-readable storage medium of claim 9, wherein the extended period of time is defined by a customer contract.

11. The computer-readable storage medium of claim 7, wherein each component part depends on a plurality of foundational functions, and wherein several component parts depend on a single shared foundational function.

12. The computer-readable storage medium of claim 11, wherein one of the conflicts includes two component parts of the several component parts having different mini-release dates.

13. A system for software development and maintenance, comprising:
  an electronic processor in communication with a non-transitory computer-readable storage medium configured to execute the following:
    identifying a plurality of component parts of an underlying software package, wherein each component part provides functionality to at least one investment area from a plurality of enterprise resource planning investment areas;
    dividing the plurality of component parts into release groups;
    proposing mini-releases, each mini-release including a subset of component parts;
    providing input parameters to a mini-release scheduler, wherein the input parameters include 1) a mapping between the each investment area and its required component parts and 2) a planned delivery date of the each mini-release to its respective at least one investment area;
    identifying conflicts between the input parameters by:
      calculating dependencies between the plurality of investment areas based on the required component parts of the each investment area, and
      determining changes to the planned delivery date of the each mini-release based on the calculated dependencies;
    notifying each development team associated with any one of the conflicts; and
    scheduling mini-releases such that the whole underlying software package is released via several consecutive mini-releases, wherein major-releases include the whole underlying software package delivered to customers, and the several consecutive mini-releases are delivered between the major-releases.

14. The system of claim 13, wherein each component part delivered in a mini-release includes a switch such that the each component part is only activated after a customer activates the switch.

15. The system of claim 13, wherein every release creates a new source code version that must be maintained by the developer for an extended period of time.

16. The system of claim 15, wherein the extended period of time is defined by a customer contract.

17. The system of claim 13, wherein each component part depends on a plurality of foundational functions, and wherein several component parts depend on a single shared foundational function.

18. The system of claim 17, wherein one of the conflicts includes two component parts of the several component parts having different mini-release dates.

* * * * *